United States Patent
Yamashiro et al.

(10) Patent No.: US 9,609,595 B2
(45) Date of Patent: Mar. 28, 2017

(54) WIRELESS COMMUNICATION APPARATUS, VEHICULAR APPARATUS, AND DISPLAY APPARATUS

(71) Applicant: DENSO CORPORATION, Kariya, Aichi-pref. (JP)

(72) Inventors: Takahisa Yamashiro, Chiryu (JP); Seigou Kumabe, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/777,716

(22) PCT Filed: Mar. 12, 2014

(86) PCT No.: PCT/JP2014/001390
§ 371 (c)(1),
(2) Date: Sep. 16, 2015

(87) PCT Pub. No.: WO2014/148004
PCT Pub. Date: Sep. 25, 2014

(65) Prior Publication Data
US 2016/0157175 A1    Jun. 2, 2016

(30) Foreign Application Priority Data

Mar. 21, 2013 (JP) ................................. 2013-058727

(51) Int. Cl.
*H04W 52/02* (2009.01)
*H04W 4/04* (2009.01)
(Continued)

(52) U.S. Cl.
CPC .......... *H04W 52/0216* (2013.01); *G08G 1/16* (2013.01); *G08G 1/163* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2010/0198459 A1* | 8/2010 | Kosai | H04W 52/267 701/36 |
| 2010/0202495 A1* | 8/2010 | Kagawa | B60T 7/22 375/142 |
| 2013/0147638 A1* | 6/2013 | Ricci | G06F 9/54 340/905 |

FOREIGN PATENT DOCUMENTS

| | | |
|---|---|---|
| EP | 2101305 A2 | 9/2009 |
| JP | 2000090395 A | 3/2000 |

(Continued)

OTHER PUBLICATIONS

International Search Report and Written Opinion (in Japanese with English Translation) for PCT/JP2014/001390, mailed Jun. 17, 2014; ISA/JP.

*Primary Examiner* — Junpeng Chen
(74) *Attorney, Agent, or Firm* — Harness, Dickey & Pierce, P.L.C.

(57) ABSTRACT

A wireless communication apparatus for a vehicle includes a receiver, a distance calculation section, and a reception frequency changing section. The receiver receives information transmitted from each external communication apparatus located outside of a host vehicle via wireless communication. The distance calculation section calculates a distance between the host vehicle and each outside target to which the external communication apparatus is provided based on position determination information when the information transmitted from the external communication apparatus includes the position determination information. A position of the outside target can be specified based on the position determination information. The reception frequency chang- (Continued)

ing section decreases an information reception frequency of the receiver in accordance with an increase in the distance between the host vehicle and one of the outside targets closest to the host vehicle.

9 Claims, 8 Drawing Sheets

(51) Int. Cl.
 G08G 1/16 (2006.01)
 H04L 29/08 (2006.01)
 H04W 64/00 (2009.01)
 H04W 84/18 (2009.01)
(52) U.S. Cl.
 CPC ............... *H04L 67/12* (2013.01); *H04W 4/04* (2013.01); *H04W 64/006* (2013.01); *H04W 84/18* (2013.01); *Y02B 60/50* (2013.01)

(56) References Cited

FOREIGN PATENT DOCUMENTS

| | | |
|---|---|---|
| JP | 2002368676 A | 12/2002 |
| JP | 2005346333 A | 12/2005 |
| JP | 2007212301 A | 8/2007 |
| JP | 2009118061 A | 5/2009 |
| JP | 2009217438 A | 9/2009 |
| JP | 2010183178 A | 8/2010 |
| WO | WO-2008107984 A1 | 9/2008 |

\* cited by examiner

WIRELESS COMMUNICATION APPARATUS, VEHICULAR APPARATUS, AND DISPLAY APPARATUS

CROSS REFERENCE TO RELATED APPLICATIONS

This application is a U.S. National Phase Application under 35 U.S.C. 371 of International Application No. PCT/JP2014/001390 filed on Mar. 12, 2014 and published in Japanese as WO 2014/148004 A1 on Sep. 25, 2014. This application is based on and claims the benefit of priority from Japanese Patent Application No. 2013-058727 filed on Mar. 21, 2013. The entire disclosures of all of the above applications are incorporated herein by reference.

TECHNICAL FIELD

The present disclosure relates to a wireless communication apparatus used in a vehicle to establish wireless communication, a vehicular apparatus including the wireless communication apparatus, and a display apparatus used in the vehicular apparatus.

BACKGROUND ART

There is a well-known technology for changing the frequency at which a host vehicle transmits information through vehicle-to-vehicle communication. For example, a technology disclosed in Patent Literature 1 decreases the frequency at which a host vehicle transmits information using a wireless communication apparatus via vehicle-to-vehicle communication when receiving a precautionary target vehicle ID from a different vehicle through vehicle-to-vehicle communication and the received precautionary target vehicle ID is not equal to the vehicle ID of the host vehicle. Herein, the precautionary target vehicle ID indicates a vehicle to which the different vehicle should pay attention to.

When the wireless communication apparatus of the host vehicle decreases the information transmission frequency for transmitting the information through the vehicle-to-vehicle communication, the amount of electrical power consumed by the information transmission will be reduced and the power consumption of the wireless communication apparatus will be reduced. However, in the wireless communication apparatus, the power consumption in standby state for waiting to receive information is greater than the power consumption for information transmission. This is because, information may be sent from external device at any time, and the wireless communication apparatus needs to get prepared for the information sent from external device at any time. Thus, the technology disclosed in Patent Literature 1 may fail to substantially reduce the power consumption of the wireless communication apparatus.

PRIOR ART LITERATURES

Patent Literature

[Patent Literature 1] JP 2009-217438 A

SUMMARY OF INVENTION

In view of the foregoing difficulties, it is an object of the present disclosure to provide a wireless communication apparatus, a vehicular apparatus, and a display apparatus each of which is able to receive presumably useful information for the host vehicle promptly with lower power consumption.

According to a first aspect of the present disclosure, a wireless communication apparatus for a vehicle includes a receiver, a distance calculation section, and a reception frequency changing section. The receiver receives information transmitted from each of multiple external communication apparatuses via a wireless communication. The multiple external communication apparatuses are located outside of a host vehicle to which the wireless communication apparatus is provided. The distance calculation section calculates a distance between the host vehicle and each of multiple outside targets based on position determination information under a condition that the information transmitted from each of the multiple external communication apparatuses includes the position determination information. The multiple outside targets being located around the host vehicle and being provided with the multiple external communication apparatuses, respectively. A position of each of the multiple outside targets is specified based on the corresponding position determination information. The reception frequency changing section decreases an information reception frequency of the receiver in accordance with an increase in the distance between the host vehicle and one of the multiple outside targets, which is located closest to the host vehicle.

With above wireless communication apparatus, presumably useful information for the host vehicle can be received more promptly with lower power consumption.

According to a second aspect of the present disclosure, a vehicular apparatus includes the wireless communication apparatus for the vehicle according to the first aspect of the present disclosure and a display apparatus. The display apparatus is disposed in the host vehicle and displays the position of each of the multiple outside targets and the position of the host vehicle on an electronic map in accordance with the position of each of the multiple outside targets and the position of the host vehicle. The position of each of the multiple outside targets is specified based on the position determination information received by the receiver of the wireless communication apparatus.

With above vehicular apparatus, presumably useful information for the host vehicle can be received more promptly with lower power consumption.

According to a third aspect of the present disclosure, a display apparatus used in the vehicular apparatus according to the second aspect of the present disclosure includes a transmitting section transmitting display state information to the wireless communication apparatus. The wireless communication apparatus included in the vehicular apparatus determining whether the position of each of the multiple outside targets is in the display state or in the non-display state on the screen of the display apparatus based on the display state information transmitted from the transmitting section.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following will describe embodiments of the present disclosure with reference to the accompanying drawings.

First Embodiment

Figure 1:
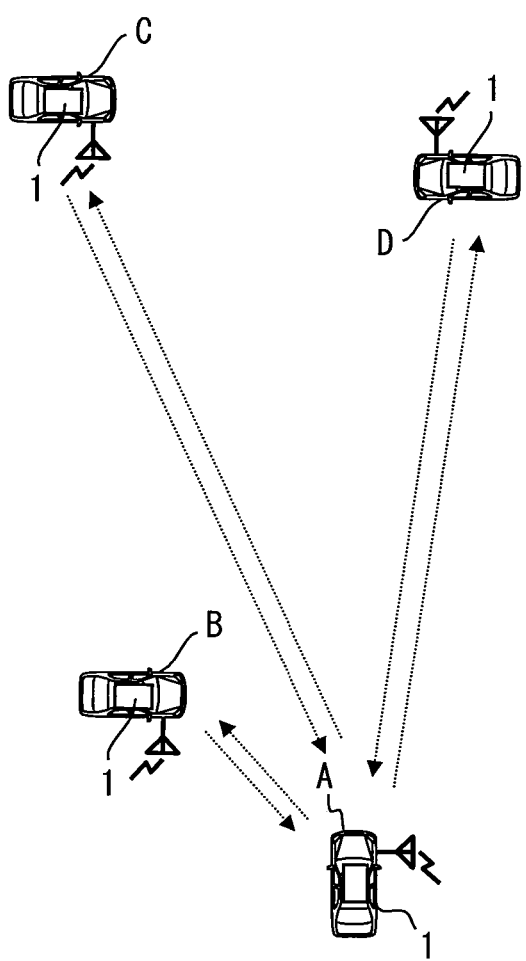
FIG. 1 is a schematic diagram illustrating an exemplary configuration of a vehicle communication system according to the present disclosure.

FIG. 1 is a schematic diagram illustrating an exemplary configuration of a vehicle communication system 100 according to the present disclosure. The vehicle communication system 100 shown in FIG. 1 includes a vehicular apparatus 1 that is used in each of multiple vehicles (vehicles A to D). The following description is given on the assumption that vehicle A is a host vehicle and vehicles B to D are peripheral vehicles positioned at a periphery of the host vehicle A.

Figure 2:
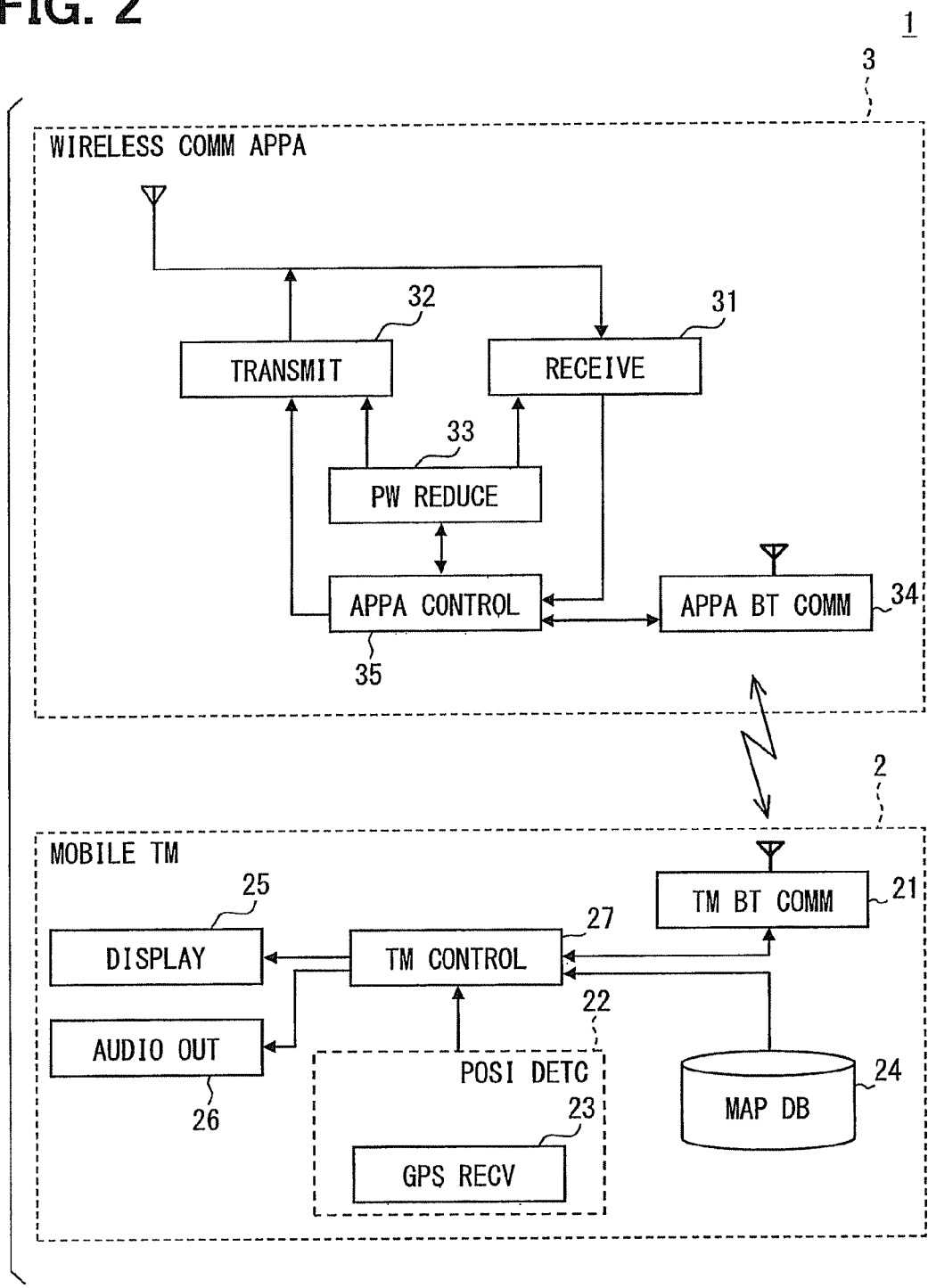
FIG. 2 is a schematic diagram illustrating an exemplary configuration of a vehicular apparatus.

A schematic configuration of the vehicular apparatus 1 will now be described with reference to FIG. 2. FIG. 2 is a schematic diagram illustrating an exemplary configuration of the vehicular apparatus 1. As shown in FIG. 2, the vehicular apparatus 1 includes a mobile terminal 2 and a wireless communication apparatus 3.

The mobile terminal 2 is able to acquire own position information of itself. The mobile terminal 2 may be provided by a smartphone or other multifunctional mobile phone with a GPS locator. Alternatively, the mobile terminal 2 may be provided by a tablet terminal or personal digital assistant (PDA) with a GPS locator. The mobile terminal 2 corresponds to a display apparatus.

The mobile terminal (MOBILE TM) 2 includes a mobile terminal Bluetooth (registered trademark, hereinafter abbreviated to BT) communication section (TM BT COMM) 21, a position detector (POSI DETC) 22, a map database (MAP DB) 24, a display screen (DISPLAY) 25, an audio output section (AUDIO OUT) 26, and a mobile terminal controller (TM CONTROL) 27. Hereinafter, the map database 24 may be referred to as the map DB 24.

The mobile terminal BT communication section 21 includes a transmission reception antenna, and exchanges information by establishing communication under Bluetooth standard (hereinafter, BT communication) with the wireless communication apparatus 3 of the host vehicle.

The position detector 22 successively detects the position of the mobile terminal in accordance with information acquired from a sensor such as a global positioning system (GPS) receiver (GPS RECV) 23 for GPS use purpose. The GPS receiver detects the current position of the local mobile terminal (hereinafter referred to as the terminal position) in accordance with radio waves transmitted from an artificial satellite. Alternatively, the position detector 22 may be provided by a sensor other than the GPS receiver 23. The terminal position may be expressed by latitude, longitude, and altitude.

The map DB 24 stores, for example, map data and drawing data. The drawing data is used to draw a road map. The map data includes link data indicating roads and node data. A link is used to join nodes when each road shown in a map is divided by multiple nodes, which represent, for example, points at which roads intersect, branch, or converge. A road is formed by connecting individual links.

The display screen 25 may be provided by a liquid-crystal display or an organic EL display. The display screen 25 displays text and images. The audio output section 26 may be provided by a speaker unit. The audio output section is used to output audio signal.

The mobile terminal controller 27, which is provided by a general computer, includes a well-known CPU, memories such as a ROM, a RAM, and an EEPROM, an I/O interface, and a bus line connecting the above-mentioned components (none of these components is shown in the figure). In accordance with various information transmitted from the mobile terminal BT communication section 21, from the position detector 22, and from the map DB 24, the mobile terminal controller 27 performs various processes by controlling the CPU to execute programs stored in the ROM.

Figure 3:
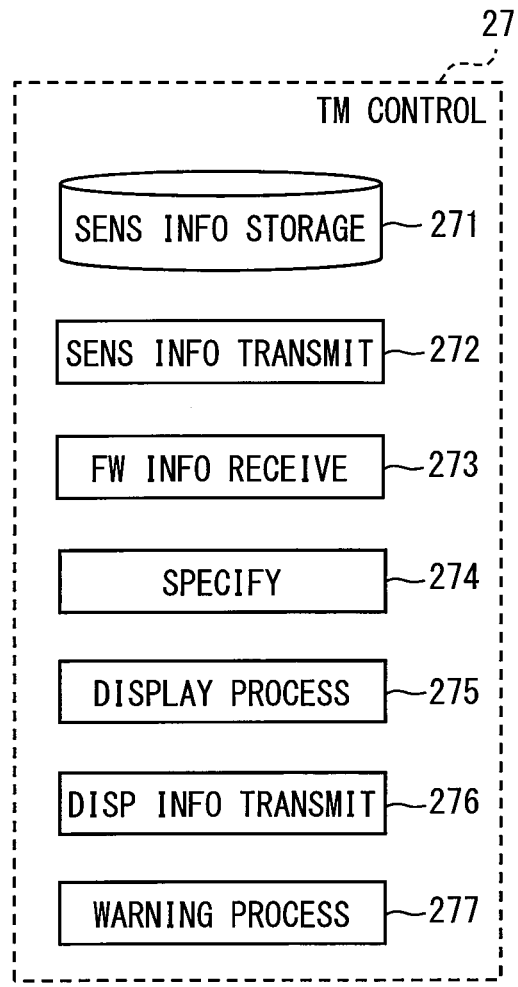
FIG. 3 is a schematic functional block diagram illustrating an exemplary configuration of a mobile terminal controller.

As shown in FIG. 3, the mobile terminal controller 27 includes various functional blocks including a sensor information storage section (SENS INFO STORAGE) 271, a sensor information transmission processing section (SENS INFO TRANSMIT) 272, a forward information reception processing section (FW INFO RECEIVE) 273, a host vehicle specifying section (SPECIFY) 274, a display processing section (DISPLAY PROCESS) 275, a display information transmission processing section (DISP INFO TRANSMIT) 276, and a warning processing section (WARNING PROCESS) 277. It is assumed that the sensor information storage section 271 is built in a RAM, an EEPROM, or other electrically rewritable memory. For the sake of convenience, elements related to functions incorporated in a common multifunctional mobile phone and non-essential for the description of the present disclosure are not described here.

The sensor information storage section 271 stores a terminal position that is successively detected by the position detector 22. When the terminal position is to be stored in the sensor information storage section 271, information indicating the time at which the terminal position was detected (that is, a timestamp) is attached to the corresponding terminal position. Further, the sensor information storage section 271 may be configured to erase the oldest stored information each time an allocated memory capacity is to be exceeded. The sensor information storage section 271 may also be configured to erase a terminal position that has been stored for a predetermined period of time.

When the sensor information transmission processing section 272 receives a terminal position acquisition request from the wireless communication apparatus 3 of the host vehicle through the mobile terminal BT communication section 21, the sensor information transmission processing section 272 reads multiple records of terminal position stored in the sensor information storage section 271 together with their timestamps. The sensor information transmission processing section 272 then transmits the readout terminal positions and timestamps to the wireless communication apparatus 3 through the mobile terminal BT communication section 21.

The forward information reception processing section 273 receives vehicle information related to another vehicle from the wireless communication apparatus 3 of the host vehicle through the mobile terminal BT communication section 21. The vehicle information of another vehicle was received by the wireless communication apparatus 3 of the host vehicle from the wireless communication apparatus 3 of another vehicle. The host vehicle specifying section 274, the display processing section 275, the display information transmission processing section 276, and the warning processing section 277 will be described later in detail.

Returning to FIG. 2, the wireless communication apparatus 3 is to be mounted in a vehicle such as an automobile. In the first embodiment, it is assumed that the wireless communication apparatus 3 is mounted in vehicles A to D, which are automobiles. The wireless communication apparatus 3 is not limited to a wireless communication apparatus mounted in an automobile. The wireless communication apparatus 3 may be provided by a communication device that is brought into and used in a vehicle or carried by a user (that is, a person). In other words, the present disclosure is applicable not only to vehicle-to-vehicle communication but also to pedestrian-to-vehicle communication between a pedestrian who carries the wireless communication apparatus 3 and a vehicle.

A schematic configuration of the wireless communication apparatus (WIRELESS COMM APPA) 3 will now be described with reference to FIG. 2. As shown in FIG. 2, the wireless communication apparatus 3 includes a receiver (RECEIVE) 31, a transmitter (TRANSMIT) 32, a power consumption reducing section (PW REDUCE) 33, a communication apparatus BT communication section (APPA BT COMM) 34, and a communication apparatus main controller (APPA CONTROL) 35. The wireless communication apparatus 3 used in a vehicle other than the host vehicle is referred to as an external communication apparatus.

When a signal is transmitted by broadcast-type wireless communication from the wireless communication apparatus 3 of a different vehicle other than the host vehicle without being relayed through a communication network, the receiver 31 receives the signal using a transmission reception antenna. Further, the receiver 31 demodulates the received signal. It is assumed that the receiver 31 includes a band-pass filter, a demodulation circuit for demodulating the received signal, and other well-known components necessary for wireless communication.

The transmitter 32 is able to transmit a signal using the transmission reception antenna by establishing a broadcast-type wireless communication without using a communication network. The transmitter 32 first modulates information transmitted from the communication apparatus main controller 35 and then transmits the modulated information.

Broadcast-type wireless communication is unidirectional communication, that is, one-way communication without ACK. In the present embodiment, signals are transmitted or received by broadcast-type vehicle-to-vehicle communication. For example, in the case of wireless communication based on 700 MHz band radio waves, vehicle-to-vehicle communication is established with another vehicle existing within a radius, for example, of 1 km from the host vehicle. In the case of wireless communication based on 5.9 GHz band radio waves, vehicle-to-vehicle communication is established with another vehicle existing within a radius, for example, of 500 m from the host vehicle.

Figure 4:
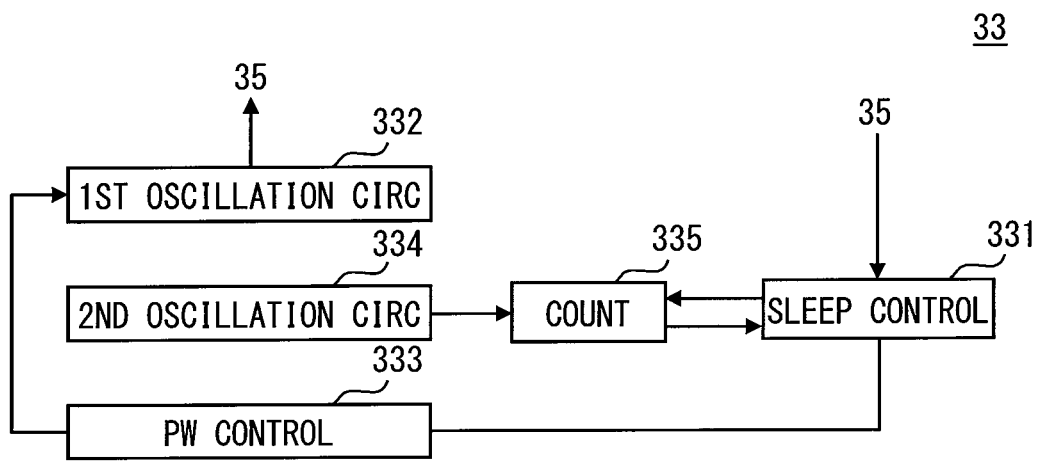
FIG. 4 is a schematic diagram illustrating an exemplary configuration of a power consumption reducing section.

The power consumption reducing section 33 reduces the power consumption by intermittently placing the receiver 31 in a sleep state. A schematic configuration of the power consumption reducing section 33 will now be described with reference to FIG. 4. As shown in FIG. 4, the power consumption reducing section 33 includes a sleep controller (SLEEP CONTROL) 331, a first oscillation circuit (1ST OSCILLATION CIRC) 332, a power supply controller (PW CONTROL) 333, a second oscillation circuit (2ND OSCILLATION CIRC) 334, and a counting section (COUNT) 335.

The first oscillation circuit 332 activates the receiver 31 by supplying an operating clock signal to the receiver 31. The first oscillation circuit 332 deactivates the receiver 31 by shutting off the supply of the operating clock signal (that is, a system clock) to the receiver 31.

The power supply controller 333 controls turning on or turning off power supply that supplies electrical power to the first oscillation circuit 332. When the power supply controller 333 turns off the power supply, the supply of electrical power to the first oscillation circuit 332 is shut off and the first oscillation circuit 332 stops the supply of the clock signal. When the power supply controller 333 turns on the power supply, electrical power is supplied to the first oscillation circuit 332 and the first oscillation circuit 332 starts the supply of the clock signal.

The second oscillation circuit 334 is an oscillation circuit that operates independently of the first oscillation circuit 332. The second oscillation circuit 334 supplies an operating clock signal to the counting section 335 in order to control operation of the counting section 335. Even when the supply of the operating clock signal from the first oscillation circuit 332 is shut off, the second oscillation circuit 334 continues to supply the operating clock signal. The counting section 335 performs a counting operation using, for example, a free-running counter or other well-known timer circuit.

The sleep controller 331 provides a reception frequency designated by the communication apparatus main controller 35. The following will describe a control example of the reception frequency. In a case where the reception frequency designated by the communication apparatus main controller 35 indicates continuous reception (that is, the sleep period is 0 sec), the sleep controller 331 does not output a power-off instruction to the power supply controller 333, and instructs the power supply controller 333 to keep the power supply on. In this case, the operating clock signal is continuously supplied from the first oscillation circuit 332 to keep the receiver 31 in awake state.

When the reception frequency designated by the communication apparatus main controller 35 does not indicate the continuous reception, the sleep controller 331 detects a time period during which the receiver 31 is in the awake state based on the time period counted by the counting section 335. When the time period during which the receiver 31 is in the awake state reaches a predetermined period of time, the sleep controller 331 outputs a power-off instruction to the power supply controller 333. When the reception frequency does not indicate continuous reception, the awake time period may be set as, for example, 100 msec or 200 msec. When the power supply controller 333 turns off the power supply, the first oscillation circuit 332 shuts off the supply of the operating clock signal to the receiver 31 so that the receiver 31 enters the sleep state. In the present disclosure, the receiver 31 does not prepare for receiving the incoming information during the sleep state.

When the sleep controller 331 determines that the sleep period of the receiver 31 reaches a predetermined period of time based on the time period counted by the counting section 335, the sleep controller 331 outputs a power-on instruction to the power supply controller 333. When the power supply controller 333 turns on the power supply, the first oscillation circuit 332 starts the supply of the operating clock signal to place the receiver 31 so that the receiver 31 switches from the sleep state to the awake state. The sleep period may be set as, for example, 0 sec, 1 sec, 5 sec, or 10 sec, according to the designation transmitted from the communication apparatus main controller 35. The reception frequency of the receiver 31 decreases with an increase of the sleep period.

The power consumption reducing section 33 may be configured to reduce the power consumption by intermittently placing not only the receiver 31 but also the transmitter 32 and the communication apparatus main controller 35 in the sleep state. In this case, the first oscillation circuit 332 further supplies the operating clock signal to the transmitter 32 and the communication apparatus main controller 35 in addition to the receiver 31.

Returning to FIG. 2, the communication apparatus BT communication section 34 includes a transmission reception antenna and establishes BT communication with the mobile terminal 2 in the host vehicle to exchange information. The communication apparatus BT communication section 34 corresponds to a communication section. In the present embodiment, the BT communication is to be established between the mobile terminal 2 and the wireless communication apparatus 3. However, the present disclosure is not limited to such a configuration. An alternative configuration may be employed so as to establish wireless communication under another short range wireless communication standard, such as ZigBee (registered trademark), or under wireless LAN standard, such as IEEE 802.11. Another alternative configuration may also be employed so as to establish communication under USB or other wired communication.

The communication apparatus main controller 35, which is provided by a general computer, includes a well-known CPU, memories such as a ROM, a RAM, and an EEPROM, an I/O device, and a bus line connecting the above-mentioned components (none of these components is shown in the figure). In accordance with various information input from the receiver 31 and the communication apparatus BT communication section 34, the communication apparatus main controller 35 performs various processes by allowing the CPU to execute a program stored in the ROM.

Figure 5:
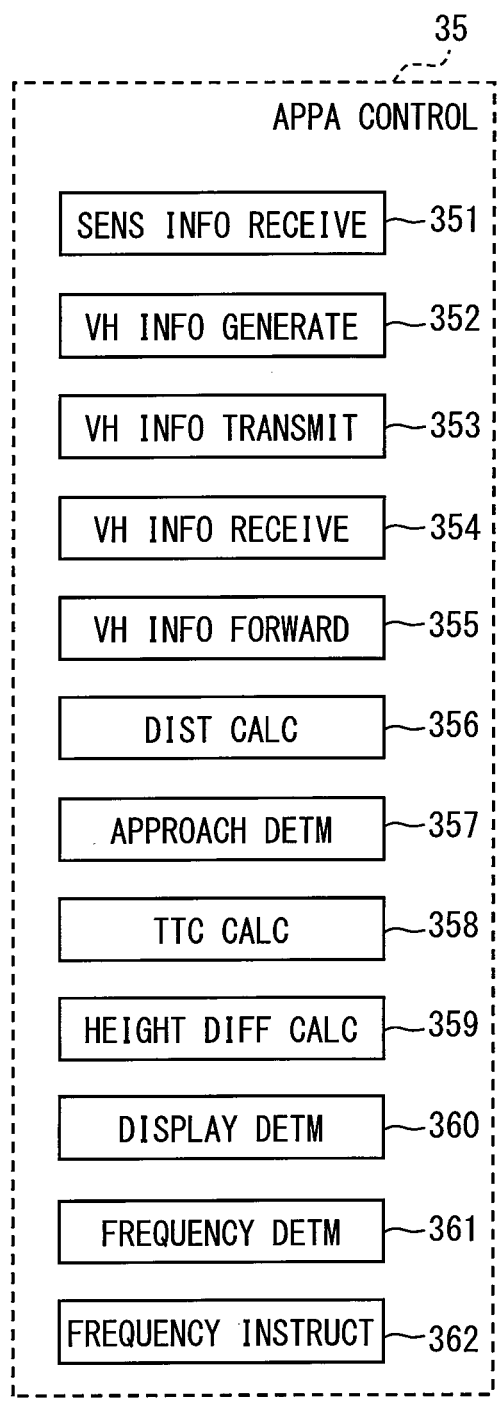
FIG. 5 is a schematic functional block diagram illustrating an exemplary configuration of a communication apparatus main controller.

As shown in FIG. 5, the communication apparatus main controller 35 includes various functional blocks, namely, a sensor information reception processing section (SENS INFO RECEIVE) 351, a vehicle information generation section (VH INFO GENERATE) 352, a vehicle information transmission processing section (VH INFO TRANSMIT) 353, a vehicle information reception processing section (VH INFO RECEIVE) 354, a vehicle information forwarding processing section (VH INFO FORWARD) 355, a distance calculation section (DIST CALC) 356, an approach determination section (APPROACH DETM) 357, an estimated encounter time calculation section (TTC CALC) 358, an altitude difference calculation section (HEIGHT DIFF CALC) 359, a display state determination section (DISPLAY DETM) 360, a reception frequency determination section (FREQUENCY DETM) 361, and a reception frequency designation section (FREQUENCY INSTRUCT) 362.

The sensor information reception processing section 351 receives a terminal position transmitted from the mobile terminal 2 through the communication apparatus BT communication section 34. The vehicle information generation section 352 generates vehicle information related to the host vehicle based on the terminal position received by the sensor information reception processing section 351. The vehicle information will be described later in detail. The vehicle information transmission processing section 353 transmits the vehicle information generated by the vehicle information generation section 352 through the transmitter 32.

Through the receiver 31, the vehicle information reception processing section 354 receives the aforementioned vehicle information transmitted from a wireless communication apparatus 3 of another vehicle. The vehicle information forwarding processing section 355 forwards the vehicle information received by the vehicle information reception processing section 354 to the mobile terminal 2 in the host vehicle through the communication apparatus BT communication section 34. The distance calculation section 356, the approach determination section 357, the estimated encounter time calculation section 358, the altitude difference calculation section 359, the display state determination section 360, the reception frequency determination section 361, and the reception frequency designation section 362 will be described later in detail.

A process related to vehicle information transmission (hereinafter referred to as the vehicle information transmission related process) that is performed by the communication apparatus main controller 35 of the wireless communication apparatus 3 will now be described with reference to the flowchart shown in FIG. 6. The process shown in the flowchart of FIG. 6 may start when the wireless communication apparatus 3 is turned on.

It is noted that a flowchart or the processing of the flowchart in the present disclosure includes sections (also referred to as steps), each of which is represented, for instance, as S1. Further, each section can be divided into several sub-sections while several sections can be combined into a single section. Furthermore, each of thus configured sections can be also referred to as a circuit, device, module, or means.

First, in step S1, the sensor information reception processing section 351 performs a sensor information reception process. Upon completion of step S1, the process proceeds to step S2. In the sensor information reception process, the communication apparatus main controller 35 transmits a terminal position acquisition request to the mobile terminal 2 through the communication apparatus BT communication section 34. Then, the mobile terminal 2 transmits the terminal position in response to the acquisition request. Then, the communication apparatus main controller 35 receives the terminal position through the communication apparatus BT communication section 34.

The present disclosure is not limited to the above-described configuration in which the wireless communication apparatus 3 transmits a terminal position acquisition request to the mobile terminal 2, and then the sensor information reception processing section 351 receives a terminal position transmitted from the mobile terminal 2 in response to the acquisition request. An alternative configuration may be employed. For example, the mobile terminal 2 transmits the latest terminal position stored in the sensor information storage section 271 at predetermined time intervals and the sensor information reception processing section 351 successively receives the terminal position transmitted from the mobile terminal at predetermined time intervals.

In step S2, the vehicle information generation section 352 performs a vehicle information generation process. Upon completion of step S2, process proceeds to step 3. In the vehicle information generation process, vehicle information to be transmitted during vehicle-to-vehicle communication is generated in accordance with the terminal position received in the sensor information reception process.

For example, in the vehicle information generation process, the vehicle information is generated using the terminal position as the vehicle position of the host vehicle. Further, in the vehicle information generation process, the vehicle information is generated to include a direction in which an imaginary line extends as an orientation of the host vehicle (that is, the traveling direction of the host vehicle). Herein, the imaginary line is determined by the least square method using multiple chronologically arranged terminal positions.

The following will describe a determination of the traveling direction of the host vehicle based on the terminal positions. The present disclosure is not limited to this configuration. In a case where the mobile terminal 2 includes a geomagnetic sensor and detection result of the geomagnetic sensor is available, the detection result of the geomagnetic sensor can be used to determine the traveling direction of the host vehicle.

Besides, in the vehicle information generation process, the vehicle speed of the host vehicle is calculated by calculating the distance traveled per unit time of the host vehicle using the chronologically arranged terminal positions of the local mobile terminal placed in the host vehicle. The calculated vehicle speed may also be included in the vehicle information.

The present embodiment is configured so that the vehicle information is generated from a terminal position acquired by the mobile terminal 2. However, the present disclosure is not limited to such a configuration. For example, in a case where the wireless communication apparatus 3 includes at least the GPS receiver 23 or other satellite positioning system receiver, the vehicle information may be generated based on the position of the wireless communication apparatus 3 of the host vehicle that can be detected by such a receiver. In this configuration, the traveling direction and vehicle speed of the host vehicle can be calculated from the position information of the wireless communication apparatus 3 of the host vehicle using the same method as the above-described method for calculating the direction and vehicle speed based on the terminal positions.

In step S3, the vehicle information transmission processing section 353 performs a vehicle information transmission process. Upon completion of step S3, process proceeds to step S4. In the vehicle information transmission process, the vehicle information generated in the vehicle information generation process is transmitted to another apparatus through the transmitter 32. The vehicle information generated in the vehicle information generation process corresponds to position determination information. The vehicle information may be transmitted, for example, at 100 msec intervals or different transmission intervals in the vehicle-to-vehicle communication of the wireless communication apparatus 3. When the transmitter 32 is also configured to intermittently enter the sleep state, the vehicle information can be transmitted while the transmitter 32 is in the awake state.

The vehicle information to be transmitted during the vehicle information transmission process includes the vehicle position of the host vehicle, the timestamp attached to such a vehicle position, and identification information for identifying a transmitting vehicle. The vehicle information may also include the traveling direction of the host vehicle, the vehicle speed of the host vehicle, and the timestamps attached to the traveling direction and vehicle speed of the host vehicle. Vehicle ID for identifying the host vehicle and a device ID for identifying the wireless communication apparatus 3 can be used as the identification information.

Figure 6:
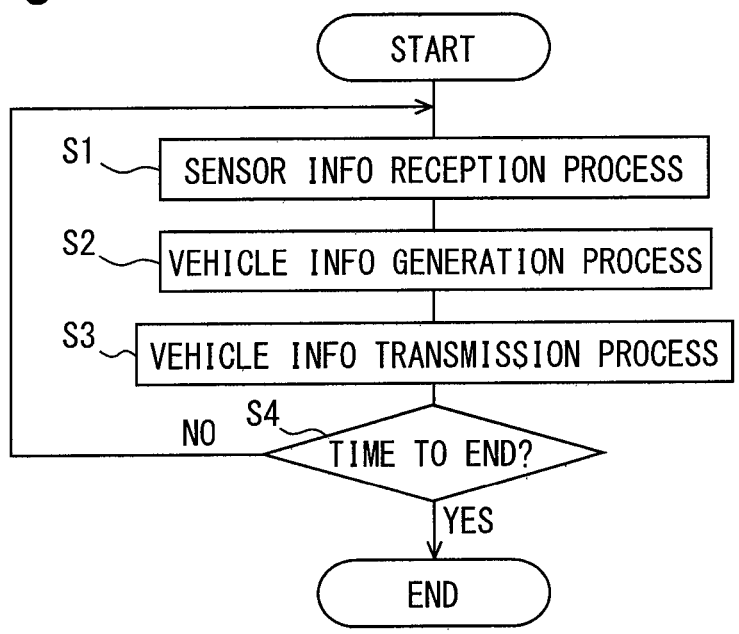
FIG. 6 is a flowchart illustrating an exemplary process related to vehicle information transmission that is performed by the communication apparatus main controller of a wireless communication apparatus.

In step S4, when the communication apparatus main controller 35 determines that it is time to end the process shown in the flowchart of FIG. 6 (step S4: "YES"), the communication apparatus main controller 35 ends the process. When the communication apparatus main controller 35 determines that it is not time to end the process shown in the flowchart of FIG. 6 (step S4: "NO"), the communication apparatus main controller 35 returns to step S1 and repeats steps S1 to S4 as described above. For example, when the wireless communication apparatus 3 is turned off, the communication apparatus main controller 35 determines that it is time to end the process shown in the flowchart of FIG. 6.

The following will describe a process related to driving assistance (hereinafter referred to as the driving assistance related process) that is carried out by the mobile terminal controller 27 of the mobile terminal 2 using vehicle information acquired by establishing vehicle-to-vehicle communication with another vehicle with reference to the flowchart of FIG. 7. The process the flowchart of FIG. 7 may start when the forward information reception processing section 273 receives the vehicle information related to another vehicle through the wireless communication apparatus 3 of the host vehicle.

In step S21, the host vehicle specifying section 274 performs a host vehicle specifying process to specify the host vehicle and a non-host vehicle based on the received vehicle information related to another vehicle. Upon completion of step S21, process proceeds to step S22. In the host vehicle specifying process, the host vehicle specifying section 274 determines the vehicle position and traveling direction of another vehicle based on the received vehicle information related to another vehicle. Further, the host vehicle specifying section 274 specifies the vehicle position and traveling direction of the host vehicle.

A terminal position that is stored in the sensor information storage section 271 of the local terminal and linked with a timestamp closest in time to the timestamp of the vehicle position of another vehicle can be read out and used as the vehicle position of the host vehicle in the host vehicle specifying process.

The traveling direction of the host vehicle that is to be used in the host vehicle specifying process can be acquired in the manner described below. First, multiple chronologically arranged terminal positions that are stored in the sensor information storage section 271 of the local terminal are read out. The multiple terminal positions are read out so that respective timestamps of the multiple terminal positions are closer to the timestamp linked to the vehicle position of another vehicle. Then, an extension direction of an imaginary line determined using the least square method based on the readout terminal positions is acquired as the traveling direction of the host vehicle.

In step S22, the display processing section 275 performs an assistance image display process. Upon completion of step S22, process proceeds to step S23. In the assistance image display process, the display screen 25 displays a mark indicative of the position of the host vehicle and the traveling direction of the host vehicle (see A in FIG. 8A) over an electronic map in accordance with data in the map DB 24 together with the positions and traveling directions of one or more different vehicles, which are specified in the host vehicle specifying process. The display screen 25 also displays, on the electronic map, marks indicating the positions and traveling directions of other vehicles (see B, C, and D in FIG. 8A) located within a predetermined range from the host vehicle.

In the assistance image display process, an electronic map is displayed at a selected scale. In the assistance image display process, the electronic map is displayed on the basis of the position of the host vehicle and the traveling direction of the host vehicle. When the electronic map is displayed on the basis of the position of the host vehicle, the position of the host vehicle is displayed, for example, at the center of the screen or at a predetermined position in a lower portion on the screen. When the electronic map is displayed on the basis of the traveling direction of the host vehicle, the host vehicle may be displayed in such a manner that the displayed host vehicle travels upward on the screen from a view of user.

The scale of the electronic map may be selected by the user who manipulates an operation controller (not shown) of the mobile terminal 2. Further, the scale of the electronic map may be automatically selected to display the map in a large-area view mode when the host vehicle is on an expressway. When the host vehicle is positioned close to a destination, the map may be displayed in a detail view mode.

In step S23, the display information transmission processing section 276 performs a display state information transmission process. Upon completion of step S23, process proceeds to step S24. In the display state information transmission process, information indicating whether the positions of different vehicles are displayed on the screen of the display screen 25 in the assistance image display process (hereinafter referred to as different vehicle display information) is transmitted to the wireless communication apparatus 3 of the host vehicle through the mobile terminal BT communication section 21. A display of the position of different vehicle corresponds to a display of a position of an outside target. The mobile terminal BT communication section 21 corresponds to a transmitting section.

In step S24, the warning processing section 277 determines whether a warning is required. The necessity of outputting a warning can be determined in accordance with a relationship between the vehicle positions and traveling directions of different vehicles specified in the host vehicle specifying process and the vehicle position and traveling direction of the host vehicle. When a straight-line distance between the vehicle position of the host vehicle and the vehicle position of different vehicle is not longer than a predetermined distance and the host vehicle and the different vehicle are approaching each other, the warning processing section 277 can determine that a warning needs to be output to the user.

The approach between the host vehicle and the different vehicle can be determined in the manner described below. First, in a two-dimensional coordinate system in which latitude and longitude are respectively represented by y-coordinate and x-coordinate, calculation is performed to determine whether a straight line extended in the traveling direction of the host vehicle intersects with a straight line extended in the traveling direction of a different vehicle (when the two straight lines intersects with each other, the intersection is referred to as the host-different vehicle path intersection). When it is determined that the host-different vehicle path intersection will be formed based on the calculation, it is determined that the host vehicle and the different vehicle are approaching to each other. When the host-different vehicle path intersection is not to be formed, it is determined that the host vehicle and the different vehicle are not approaching to each other.

In step S24, when determined that a warning needs to be made (step S24: "YES"), process proceeds to step S25. In step S24, when determined that no warning needs to be made (step S24: "NO"), process proceeds to step S26.

Figure 8A:
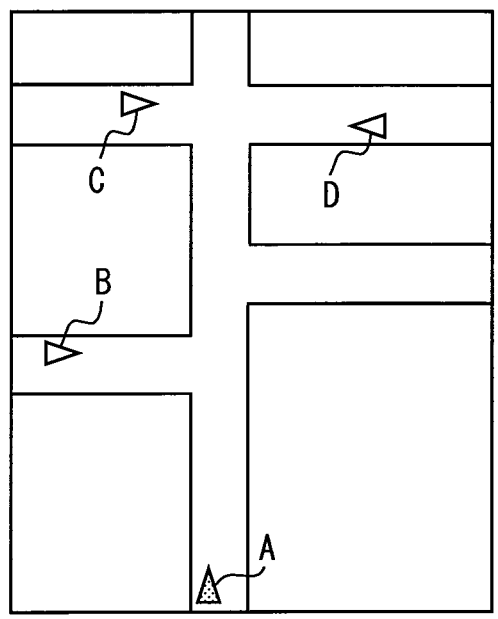
FIG. 8A and FIG. 8B are schematic diagrams illustrating exemplary display screens that appears on a display screen of the mobile terminal.
Figure 8B:
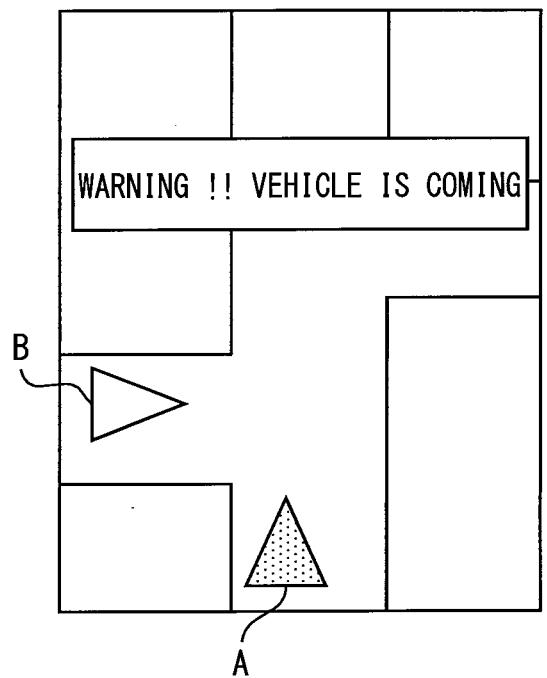

In step S25, the warning processing section 277 performs a warning process. Upon completion of step S25, process proceeds to step S26. In the warning process, a warning is made to notify the user that another vehicle is approaching the host vehicle. For example, as shown in FIG. 8A, the display screen 25 displays an enlarged view of an area near the host vehicle, which includes a mark indicative of the position of the host vehicle (see A in the figure) and a mark indicative of the position of another vehicle (see B in the figure), and additionally displays a text message such as "Warning!! Vehicle is coming". In this case, the audio output section 26 may output an audio message such as "Warning!! Vehicle is coming".

Figure 7:
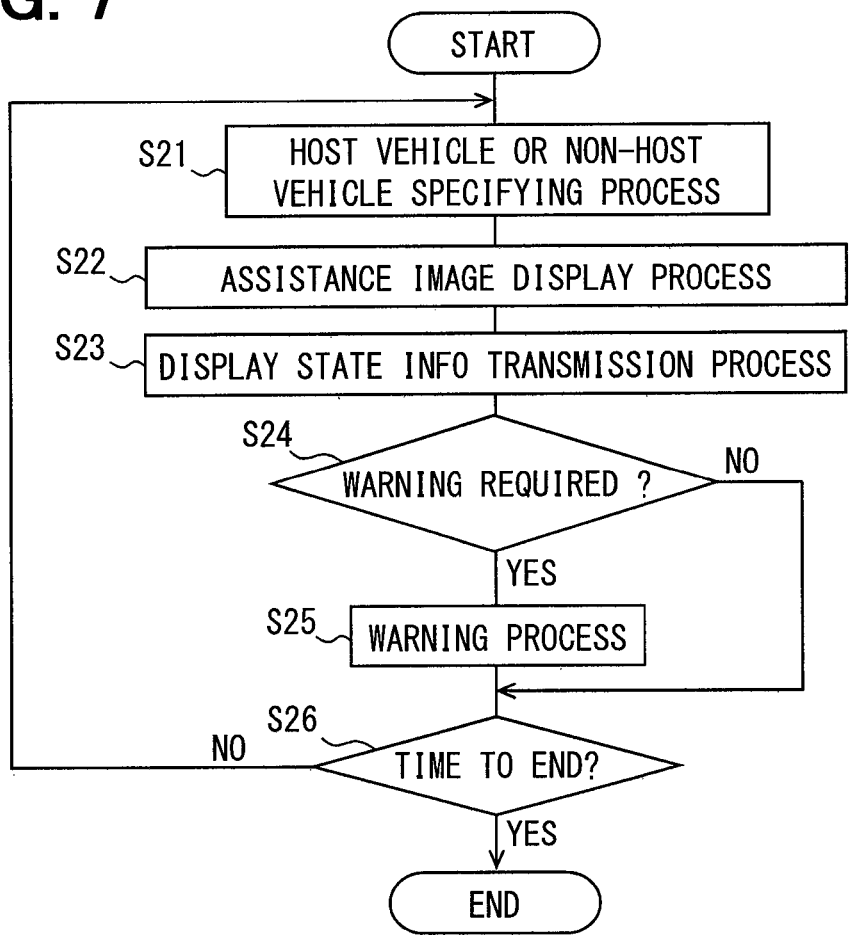
FIG. 7 is a flowchart illustrating an exemplary process related to driving assistance that is performed by the mobile terminal controller of a mobile terminal.

In step S26, the process in the flowchart of FIG. 7 terminates when the process is timed to end (step S26: "YES"). When the process is not timed to end (step S26: "NO"), process returns to step S21 and repeats steps S21 to S26 as described above. The driving assistance related process is supposed to end at a timing at which, for example, a user manipulation made to terminate an application of the driving assistance related process on the mobile terminal 2 is accepted by the operating controller of the mobile terminal 2.

The following will describe a process related to reception frequency determination (hereinafter referred to as the reception frequency determination related process) that is performed by the communication apparatus main controller 35 of the wireless communication apparatus 3 with reference to the flowchart of FIG. 9. The process in the flowchart of FIG. 9 may start when the wireless communication apparatus 3 is turned on.

First, in step S41, when the vehicle information related to another vehicle that is transmitted from the wireless communication apparatus 3 of another vehicle is received within a predetermined period of time (step S41: "YES"), process proceeds to step S42. When the vehicle information related to another vehicle is not received within the predetermined period of time (step S41: "NO"), process proceeds to step S44.

When the determined reception frequency indicates continuous reception (that is, the sleep period of the receiver 31 is 0 sec), the above-mentioned predetermined period of time can be set as an elapsed time period from the last vehicle information transmission to the following vehicle information transmission. When the determined reception frequency does not indicate continuous reception, the above-mentioned predetermined period of time can be set as the latest awake period of the receiver 31.

In step S42, a status determination process is performed. Upon completion of step S42, process proceeds to step S43.

In the status determination process, at least the distance between the host vehicle and the different vehicle is determined in accordance with the vehicle information related to the different vehicle, which was received within the above-mentioned predetermined period of time, and in accordance with the vehicle information of the host vehicle. In the status determination process, additionally, the approach status between the host vehicle and the different vehicle, the estimated time of an encounter between the host vehicle and the different vehicle (hereinafter referred to as TTC), the altitude difference between the host vehicle and the different vehicle, and display state of the position of the different vehicle on the screen of the display screen 25 of the mobile terminal 2 may be determined.

The distance between the host vehicle and the different vehicle can be determined by allowing the distance calculation section 356 to calculate the straight-line distance between the position of the host vehicle and the position of the different vehicle. The distance calculation section 356 calculates the straight-line distance between the host vehicle and the different vehicle in accordance with the vehicle position of the host vehicle and the vehicle position of the different vehicle, which is included in the vehicle information of the different vehicle. A terminal position that is received from the mobile terminal 2 by the sensor information reception processing section 351 and linked with a timestamp closest in time with the timestamp of the vehicle position of the different vehicle can be used as the vehicle position of the host vehicle.

The approach between the host vehicle and the different vehicle can be determined by the approach determination section 357. The approach determination section 357 determines the approach between the host vehicle and the different vehicle in accordance with the vehicle position and traveling direction of the host vehicle and with the vehicle position and traveling direction of the different vehicle, which is included in the vehicle information related to the different vehicle. The approach between the host vehicle and the different vehicle can be determined in the same manner as in step S24, which was described earlier.

The traveling direction of the host vehicle can be acquired in the manner described below. First, multiple chronologically arranged terminal positions that are received from the mobile terminal 2 by the sensor information reception processing section 351 and linked with respective timestamps closest in time to the timestamp of the vehicle position of the different vehicle are extracted. Then, an extension direction of an imaginary line determined using the least square method based on the extracted terminal positions is acquired as the traveling direction of the host vehicle.

The TTC between the host vehicle and the different vehicle can be determined by allowing the estimated encounter time calculation section 358 to calculate the TTC between the host vehicle and the different vehicle. In the same manner as in step S24, the estimated encounter time calculation section 358 determines the host-different vehicle path intersection from the vehicle position and traveling direction of the host vehicle and the vehicle position and traveling direction of the different vehicle, which is included in the vehicle information related to the different vehicle. Further, from the vehicle speed of the host vehicle, the vehicle position of the host vehicle, and the host-different vehicle path intersection, the estimated encounter time calculation section 358 calculates the TTC, which is equivalent to the time remained before the host vehicle reaches the host-different vehicle path intersection. The TTC can be calculated by dividing the straight-line distance between the vehicle position of the host vehicle and the host-different vehicle path intersection by the vehicle speed of the host vehicle.

The vehicle speed of the host vehicle can be acquired in the manner described below. First, multiple chronologically arranged terminal positions that are received from the mobile terminal 2 by the sensor information reception processing section 351 and linked with respective timestamps closest in time to the timestamp of the vehicle position of the different vehicle are extracted. The vehicle speed of the host vehicle is then determined by calculating the distance traveled per unit time by the host vehicle based on the extracted terminal positions of the local terminal.

The altitude difference between the host vehicle and the different vehicle can be determined by allowing the altitude difference calculation section 359 to calculate the altitude difference between the host vehicle and the different vehicle. From the altitude of the host vehicle and the altitude of the different vehicle, which is included in the vehicle information related to the different vehicle, the altitude difference calculation section 359 calculates the altitude difference between the host vehicle and the different vehicle. An altitude included in the information related to a terminal position that is received from the mobile terminal 2 by the sensor information reception processing section 351 and linked with a timestamp closest in time to the timestamp of the vehicle position of the different vehicle can be used as the altitude of the host vehicle.

When the vehicle information related to each of multiple different vehicles is received within the predetermined period of time, the distance between the host vehicle and the different vehicle, the approach between the host vehicle and the different vehicle, the TTC between the host vehicle and the different vehicle, and the altitude difference between the host vehicle and the different vehicle are determined for each of the different vehicles.

Whether or not to display the position of another vehicle on the screen of the display screen 25 of the mobile terminal 2 (hereinafter referred to as the different vehicle display) can be determined by the display state determination section 360. From the different vehicle display information successively transmitted from the mobile terminal 2, the display state determination section 360 determines whether to perform the different vehicle display. More specifically, when the different vehicle display information indicates that the position of the different vehicle needs to be displayed on the display screen 25, the display state determination section 360 determines that the different vehicle display is necessary. When the different vehicle display information indicates that the position of the different vehicle needs not to be displayed on the display screen 25, the display state determination section 360 determines that the different vehicle display is not necessary.

In step S43, the reception frequency determination section 361 performs a first reception frequency determination process. Upon completion of step S43, process proceeds to step S45. In the first reception frequency determination process, the reception frequency of the receiver 31 is determined in accordance with the status determined in the status determination process. An example of the first reception frequency determination process is described below. The reception frequency determination section 361 corresponds to a reception frequency changing section.

The reception frequency determined in the first reception frequency determination process decreases with an increase in a shortest distance to the host vehicle, which is calculated by the distance calculation section 356. As an example, when the calculated distance is longer than a threshold value D1, the reception frequency is determined so that the sleep period is equal to 10 sec. When the calculated distance is not longer than the threshold value D1, but is longer than a threshold value D2, the reception frequency is determined so that the sleep period is equal to 1 sec. When the calculated distance is not longer than the threshold value D2, the reception frequency is determined so that the sleep period is equal to 0 sec. Herein, D1>D2. The threshold value D1 may be set as 250 m, and the threshold value D2 may be set as 100 m. Another vehicle whose distance to the host vehicle is the shortest according to the result of calculation by the distance calculation section 356 can be extracted as the closest different vehicle to the host vehicle.

In the above example, the reception frequency is selected from three options in accordance with the distance between the host vehicle and the closest different vehicle to the host vehicle. However, the present disclosure is not limited to selecting the reception frequency from three different options. Alternatively, the reception frequency may be selected from two different options or selected from more than three different options.

It is considered when the distance between the host vehicle and the different vehicle gets longer, the possibility of affecting the operation of the host vehicle becomes lower. It is therefore estimated that the vehicle information transmitted from the different vehicle positioned far from the host vehicle has low reference value for the host vehicle. In the configuration according to the present embodiment, the reception frequency decreases with an increase in the distance between the host vehicle and the different vehicle located closest to the host vehicle. Therefore, the reception frequency can be decreased with a decrease of the possibility by which the useful information for the host vehicle is transmitted from different vehicle. Accordingly, the length of time for reception waiting decreases with the decrease of the information reception frequency in the receiver 31. Therefore, the power consumption of the wireless communication apparatus 3 can be reduced. Thus, the wireless communication apparatus 3 is able to receive presumably useful information for the host vehicle more promptly while reducing the power consumption.

In the first reception frequency determination process, the reception frequency of the receiver 31 may be determined in consideration of not only the distance calculated by the distance calculation section 356 but also the approach between the host vehicle and the different vehicle, which is determined by the approach determination section 357.

In the first reception frequency determination process, in a case where the calculated distance between the host vehicle and the closest different vehicle to the host vehicle is not longer than a predetermined threshold value (for example, the aforementioned threshold value D2), the reception frequency of the receiver 31 may be decreased when the different vehicle is not approaching the host vehicle.

As an example, the lowest reception frequency can be selected when the approach determination section 357 has determined that another vehicle closest to the host vehicle is not approaching the host vehicle. When the approach determination section 357 has determined that another vehicle closest to the host vehicle is approaching the host vehicle, the reception frequency can be decreased with an increase of the distance between the host vehicle to another vehicle.

As another example, the lowest reception frequency may be selected when the approach determination section 357 has determined none of the different vehicles is approaching the host vehicle. When the approach determination section 357 has determined that different vehicles are approaching the host vehicle, the reception frequency may be decreased with an increase of the distance between the host vehicle and the closest different vehicle.

Other vehicles that are not approaching the host vehicle can be regarded as the different vehicles that are not likely to affect the driving operation of the host vehicle. Therefore, the vehicle information transmitted from the different vehicles that are positioned close to the host vehicle but are not approaching the host vehicle is estimated to be not useful for the host vehicle. Consequently, the above-described configuration makes it possible to receive presumably useful information for the host vehicle more promptly while reducing the power consumption.

Further, in the first reception frequency determination process, the reception frequency of the receiver 31 may be determined in consideration of the TTC between the host vehicle and the different vehicle, which is calculated by the estimated encounter time calculation section 358, in addition to the approach between the host vehicle and another vehicle, which is determined by the approach determination section 357. The TTC is determined using the distance calculated by the distance calculation section 356. Therefore, the consideration of the TTC means the consideration of the distance calculated by the distance calculation section 356.

As an example, in the first reception frequency determination process, the lowest reception frequency can be selected when the approach determination section 357 has determined that no other vehicles are approaching the host vehicle. When the approach determination section 357 has determined that another vehicle closest to the host vehicle is approaching the host vehicle, the reception frequency can be decreased with an increase in the TTC between the host vehicle and the different vehicle.

As another example, the lowest reception frequency may be selected when the approach determination section 357 has determined that no other vehicles are approaching the host vehicle. When the approach determination section 357 has determined that other vehicles are approaching the host vehicle, the reception frequency may be decreased with an increase in the TTC between the host vehicle and the different vehicle closest to the host vehicle.

Figure 10:
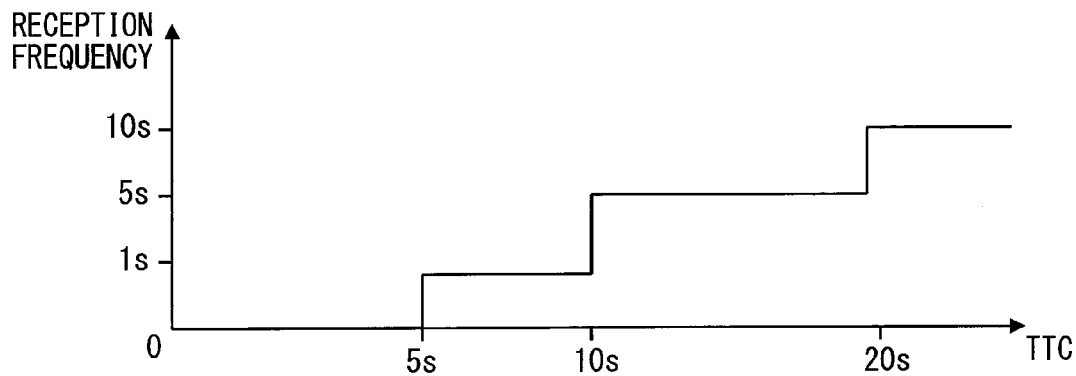
FIG. 10 is a diagram illustrating an exemplary relationship in which the frequency of reception is determined to decrease with an increase in the estimated time of encountering another vehicle.

FIG. 10 shows an exemplary relationship between an increase in the TTC between the host vehicle and another vehicle and a decrease in the reception frequency. More specifically, when the TTC is not longer than 5 sec, the reception frequency is determined so that the sleep period is equal to 0 sec. When the TTC is longer than 5 sec but not longer than 10 sec, the reception frequency is determined so that the sleep period is equal to 1 sec. Further, when the TTC is longer than 10 sec but not longer than 20 sec, the reception frequency is determined so that the sleep period is equal to 5 sec. When the TTC is longer than 20 sec, the reception frequency is determined so that the sleep period is 10 sec.

The vehicle information transmitted from another vehicle that is approaching the host vehicle is estimated to be not useful for the host vehicle when the TTC between the host vehicle and the different vehicle is relatively long. Consequently, the above-described configuration makes it possible to receive presumably useful information for the host vehicle more promptly while reducing the power consumption.

Further, in the first reception frequency determination process, the reception frequency of the receiver 31 may be determined in consideration of not only the distance calculated by the distance calculation section 356 but also the altitude difference between the host vehicle and another vehicle, which is calculated by the altitude difference calculation section 359.

For example, in the first reception frequency determination process, even when the calculated distance between the host vehicle and another vehicle closest to the host vehicle is not longer than a predetermined threshold value (for example, the aforementioned threshold value D2), the reception frequency of the receiver 31 can be decreased as far as it is determined that the altitude difference between the host vehicle and the different vehicle is not smaller than a predetermined value.

Figure 11:
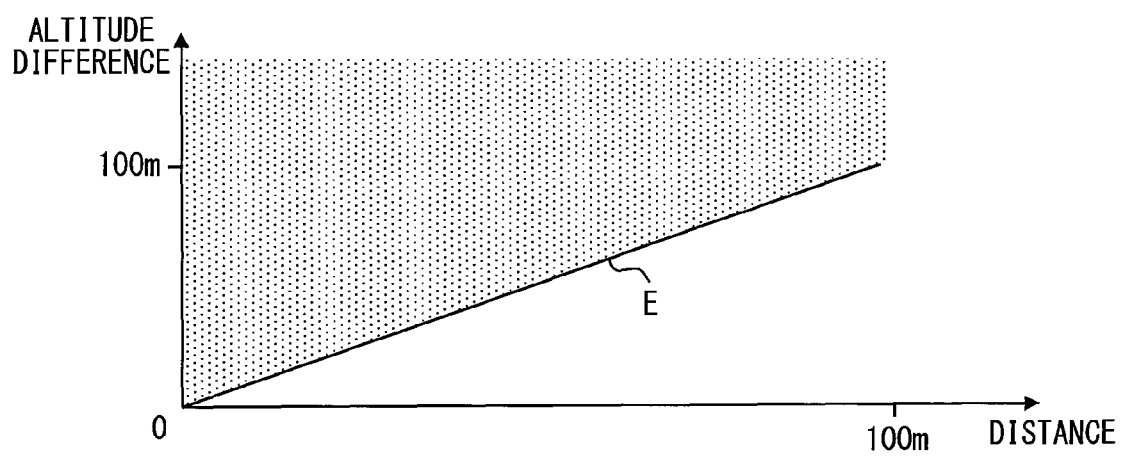
FIG. 11 is a diagram illustrating a predetermined value that is set to increase with a decrease in the distance between a host vehicle and another vehicle.

Further, in the first reception frequency determination process, the lowest reception frequency may be selected when it is determined that the altitude difference between the host vehicle and another vehicle is not smaller than a value (see line E in FIG. 11), which increases corresponding to a decrease in the distance calculated by the distance calculation section 356.

Moreover, the reception frequency may be decreased with an increase in the distance between the host vehicle and another vehicle that is closest to the host vehicle and different in altitude from the host vehicle by a value smaller than the predetermined value. Herein, the predetermined value is a value that increases with a decrease in the distance calculated by the distance calculation section 356.

The vehicle information transmitted from another vehicle that is at a short distance from the host vehicle but significantly different in altitude from the host vehicle is estimated to be not useful for the host vehicle. In a typical case, when another vehicle is different in altitude from the host vehicle, the host vehicle and another vehicle may be, respectively, positioned on an ordinary road and on an elevated road. Consequently, the above-described configuration makes it possible to receive presumably useful information for the host vehicle more promptly while reducing the power consumption.

Further, in the first reception frequency determination process, the reception frequency of the receiver 31 may be determined in consideration of not only the distance calculated by the distance calculation section 356 but also the display state of another vehicle, which is determined by the display state determination section 360.

For example, in the first reception frequency determination process, when the display state determination section 360 has determined not to perform a display of another vehicle, the reception frequency can be determined to be lower compared with a case in which the display state determination section 360 has determined to perform a display of another vehicle.

As an example, the lowest reception frequency can be selected when the display state determination section 360 has determined not to perform a display of another vehicle. When the display state determination section 360 has determined to perform a display of another vehicle, the reception frequency can be decreased with an increase in the distance between the host vehicle and another vehicle closest to the host vehicle.

As another example, when the display state determination section 360 has determined not to perform a display of different vehicles, the reception frequency may be decreased with an increase in the distance between the host vehicle and another vehicle closest to the host vehicle. When the display state determination section 360 has determined to perform a display of different vehicles, the highest reception frequency may be selected for the receiver.

The vehicle information transmitted from another vehicle and displayed on the display screen 25 of the mobile terminal 2 is estimated to be useful for the host vehicle. However, the vehicle information transmitted from another vehicle that is not displayed on the display screen 25 is estimated to be not useful for the host vehicle. Consequently, the above-described configuration makes it possible to receive presumably useful information for the host vehicle more promptly while reducing the power consumption.

The foregoing examples are merely illustrative. The first reception frequency determination process may be configured so as to determine the reception frequency using a combination other than the above-described combinations of items of information acquired by the status determination process.

In step S44, which is performed when the vehicle information related to another vehicle has not been received within the predetermined period of time, the reception frequency determination section 361 performs a second reception frequency determination process. Upon completion of step S44, process proceeds to step S45. In the second reception frequency determination process, the lowest reception frequency is selected.

In step S45, the reception frequency designation section 362 performs a reception frequency designation process. Upon completion of step S45, process proceeds to step S46. In the reception frequency designation process, the reception frequency designation section 362 instructs the power consumption reducing section 33 in order to set the reception frequency equal to the value determined by the reception frequency determination section 361. When the first reception frequency determination process was performed before step S45, the reception frequency designation process is performed to output an instruction so that the reception frequency is set equal to a value determined in the first reception frequency determination process. When the second reception frequency determination process was performed before step S45, the reception frequency designation process is performed to output an instruction so that the reception frequency is set equal to a value determined in the second reception frequency determination process.

Figure 9:
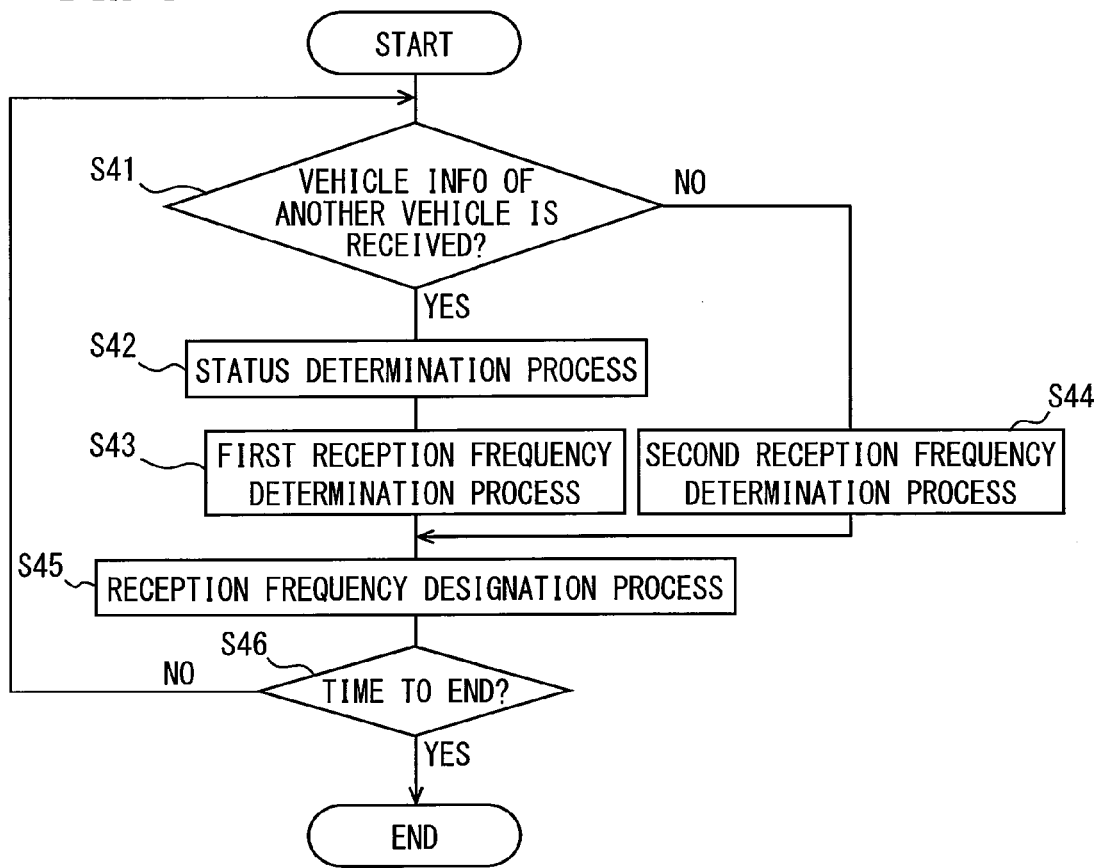
FIG. 9 is a flowchart illustrating an exemplary process related to reception frequency determination that is performed by the communication apparatus main controller of the wireless communication apparatus.

In step S46, the processing steps indicated in the flowchart of FIG. 9 terminate when the reception frequency determination related process is timed to end (step S46: "YES"). When the reception frequency determination related process is not timed to end (step S46: "NO"), process returns to step S41 and repeats steps S41 to S46 as described above. For example, the reception frequency determination related process is supposed to end when the wireless communication apparatus 3 is turned off. When process returns to step S41 and repeats steps S41 to S46 as described above, process can switch to a subsequent predetermined period, and then return to step S41 to repeat steps S41 to S46 as described above.

According to the configuration of the present embodiment, when another vehicle has low possibility to transmit presumably useful information for the host vehicle, the information reception frequency of the receiver 31 is decreased. Thus, the power consumption of the apparatus can be reduced. When a different vehicle designated as the outside target has high possibility to transmit presumably useful information for the host vehicle, a decrease in the information reception frequency of the receiver 31 is avoided to be decreased. With this configuration, presumably useful information for the host vehicle can be received more promptly.

The flowchart of FIG. 9 indicates that the reception frequency is determined in the first reception frequency determination process or in the second reception frequency determination process is performed. However, the determination of the reception frequency is not limited to this configuration. The reception frequency need not always be performed in the first reception frequency determination process or in the second reception frequency determination process. For example, the reception frequency may be reset when the display state determination section 360 has changed its determination as to whether to display another vehicle on the display screen 25.

When the above-mentioned exemplary configuration is applied, the display state determination section 360 can successively determine, in accordance with the different vehicle display information successively transmitted from the mobile terminal 2, whether or not to display another vehicle. When the scale of the electronic map to be displayed on the display screen 25 of the mobile terminal 2 changes and the result of determination by the display state determination section 360 switches from displaying other vehicles to not displaying any other vehicle, the reception frequency determination section 361 can decrease the reception frequency. When the scale of the electronic map changes and the result of determination by the display state determination section 360 switches from displaying no other vehicles to displaying one or more different vehicles, the reception frequency determination section 361 can increase the reception frequency.

When the reception frequency is to be decreased, the reception frequency may be decreased by one level or decreased to the lowest level. When the reception frequency is to be increased, the reception frequency may be increased by one level or increased to the highest level.

According to the above-described configuration, when the scale of the electronic map to be displayed on the display screen 25 of the mobile terminal 2 changes and the display screen 25 changes the display between the display of different vehicles and the display of no vehicles, the reception frequency can be changed promptly in response to the above changes. As a result, it is possible to receive presumably useful information for the host vehicle more promptly while reducing the power consumption.

The present embodiment is configured so that the position of the host vehicle and the positions of the different vehicles are displayed over the electronic map on the screen of the display screen 25. However, the present disclosure is not limited to such a configuration. Alternatively, the position of the host vehicle and the positions of the different vehicles may be displayed without displaying the electronic map on the screen of the display screen 25. When such an alternative scheme is adopted, the aforementioned scale of the map can be replaced by the scale of relative positional relationship between the host vehicle and the different vehicles.

Second Embodiment

The present disclosure is not limited to the first embodiment, which has been described above. The technical scope of the present disclosure also encompasses a second embodiment, which will be described below. For convenience of explanation, components having the same function as the components depicted in the figures used for the description of the foregoing embodiment will be designated by the same reference numerals as their counterparts and will not be redundantly described.

A vehicle communication system 100a according to the second embodiment is similar to the vehicle communication system 100 according to the first embodiment except that information transmitted from a wireless communication apparatus 4 used in a roadside device installed at an intersection is received instead of receiving information transmitted from the wireless communication apparatus 3 used in moving objects such as vehicles other than the host vehicle. More specifically, the vehicle communication system 100a according to the second embodiment is similar to the vehicle communication system 100 according to the first embodiment except that the vehicle communication system 100a and the vehicle communication system 100 partly differ from each other in the processes performed by the communication apparatus main controller 35 and receiver 31 in the wireless communication apparatus 3 of the host vehicle and the process performed by the mobile terminal controller 27 of the mobile terminal 2 positioned in the host vehicle.

Figure 12:
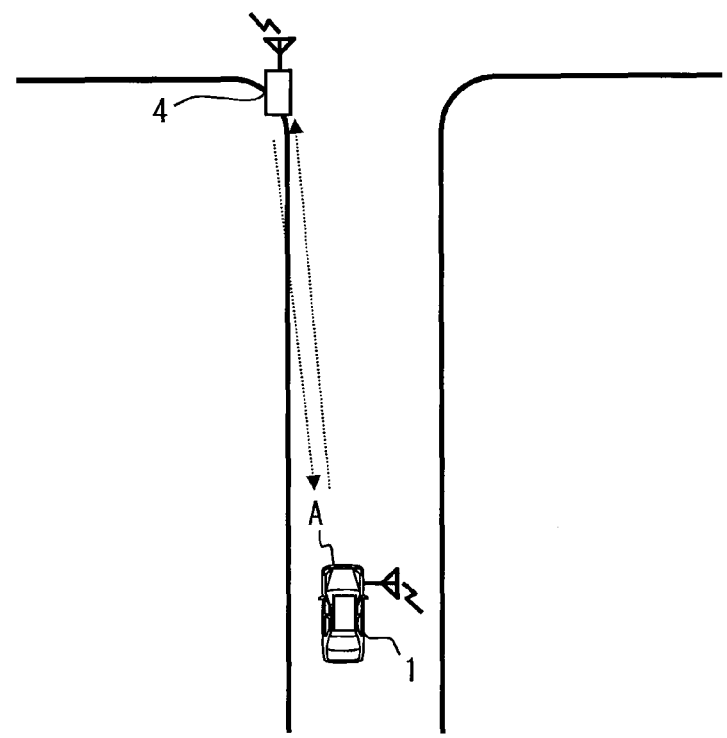
FIG. 12 is a schematic diagram illustrating an exemplary configuration of the vehicle communication system.

A schematic configuration of the vehicle communication system 100a according to the second embodiment will now be described with reference to FIG. 12. The vehicle communication system 100a shown in FIG. 12 includes a vehicular apparatus 1 and a wireless communication apparatus 4. The vehicular apparatus 1 is used in the host vehicle A in FIG. 12. The wireless communication apparatus 4 is included in a roadside device installed at an intersection.

The wireless communication apparatus 4 transmits information indicative of the position of the intersection, for example, through broadcast-type wireless communication without using a communication network. The information indicative of the position of the intersection may be the positional coordinates of the roadside device installed at the intersection or the preliminarily stored positional coordinates of a central position of the intersection. The present embodiment will be subsequently described on the assumption that the information indicative of the position of the intersection is provided by the positional coordinates of the central position of the intersection.

Through a transmission reception antenna, the receiver 31 of the wireless communication section 3 receives a signal transmitted through broadcast-type wireless communication from the wireless communication apparatus 4 without using a communication network. The intersection at which the roadside device including the wireless communication apparatus 4 is installed is hereinafter referred to as a target intersection.

The driving assistance related process by the mobile terminal controller 27 of the mobile terminal 2 is performed by using the central position of the target intersection instead of using the vehicle position of another vehicle. As an example, in the assistance image display process performed by the display processing section 275, the display screen 25 displays a mark indicative of the position and traveling direction of the host vehicle over the electronic map in accordance with the position and traveling direction of the host vehicle and in accordance with the central position of the target intersection. Further, the target intersection located within a range displayed on the display screen 25 is also displayed over the electronic map by the display screen 25.

In the display state information transmission process performed by the display information transmission processing section 276, information (hereinafter referred to as the target intersection display state information) indicative of whether the position of the target intersection is displayed on the display screen 25 (hereinafter referred to as the target intersection display) is transmitted to the wireless communication apparatus 3 of the host vehicle through the mobile terminal BT communication section 21. Thus, a display of the position of the target intersection also corresponds to a display of the position of an outside target.

The warning processing section 277 determines whether it is necessary to provide guidance on the target intersection. When it is determined that the guidance on the target intersection needs to be provided, the warning processing section 277 provides guidance on the target intersection. Whether to provide guidance on the target intersection can be determined in accordance with the central position of the target intersection together with the vehicle position and traveling direction of the host vehicle. As an example, when the straight-line distance between the vehicle position of the host vehicle and the target intersection is not longer than a predetermined distance and the host vehicle is traveling toward the target intersection, it can be determined that the guidance needs to be provided to the user. The guidance can be provided by controlling the display screen 25 to display an enlarged view of the target intersection.

In the reception frequency determination related process performed by the communication apparatus main controller 35 of the wireless communication apparatus 3, a process related to reception frequency determination is performed by using the central position of the intersection instead of the vehicle position of another vehicle.

The status determination process can be performed to determine the distance between the host vehicle and the target intersection, determine the approach of the host vehicle to the target intersection, determine the estimated time of arrival of the host vehicle to the target intersection, and determine whether or not to display the target intersection.

The distance calculation section 356 can determine the distance between the host vehicle and the target intersection by calculating the straight-line distance between the host vehicle and the central position of the target intersection. The approach determination section 357 can determine the approach of the host vehicle to the target intersection by determining whether the host vehicle is traveling toward the target intersection.

The estimated encounter time calculation section 358 can determine the estimated time of arrival of the host vehicle to the target intersection by dividing the straight-line distance between the vehicle position of the host vehicle and the central position of the target intersection by the vehicle speed of the host vehicle. Whether or not to display the target intersection can be determined in accordance with the target intersection display state information successively transmitted from the mobile terminal 2.

In the first reception frequency determination process, the distance between the host vehicle and the target intersection can be handled in the same manner as the distance between the host vehicle and another vehicle in the first embodiment. Further, the approach of the host vehicle to the target intersection can also be handled in the same manner as the approach between the host vehicle and another vehicle in the first embodiment. Furthermore, the estimated time of arrival of the host vehicle to the target intersection can be handled in the same manner as the TTC between the host vehicle and another vehicle in the first embodiment. Moreover, whether or not to display the target intersection can be handled in the same manner as whether or not to display another vehicle in the first embodiment. The second reception frequency determination process can be performed when the information transmitted from the wireless communication apparatus 4 is not received.

The configuration of the second embodiment also makes it possible to receive presumably useful information for the host vehicle more promptly while reducing the power consumption. An alternative is to adopt a configuration that is obtained when the first embodiment is combined with the second embodiment.

It is assumed that the foregoing embodiments are configured to determine the position, traveling direction, and vehicle speed of a vehicle from the terminal position of the mobile terminal 2. However, the present disclosure is not limited to such a configuration. For example, the position, traveling direction, and vehicle speed of a vehicle may alternatively be acquired from a vehicle-mounted sensor or ECU or from a vehicle-mounted navigation device through a vehicle-mounted LAN or the like. In such an alternative configuration, the vehicle-mounted navigation device may be used as the display apparatus instead of the mobile terminal 2.

A wireless communication apparatus according to the present disclosure is a wireless communication apparatus 3 that includes a receiver. The receiver receives information transmitted by wireless communication from an external communication apparatus, which is a communication apparatus located outside of the host vehicle. The wireless communication apparatus 3 further includes a distance calculation section 356 and a reception frequency changing section 361. When the receiver receives, from the external communication apparatus, position determination information, which determines the positions of outside targets that use the external communication apparatus, the distance calculation section 356 calculates the distance between the host vehicle and each of the outside targets by using the position determination information. The reception frequency changing section 361 decreases the information reception frequency of the receiver in accordance with an increase in the distance to an outside target closest to the host vehicle. Herein, the distance is calculated by the distance calculation section.

When the information reception frequency of the receiver is decreased, the length of time for waiting incoming information decreases accordingly. Therefore, the power consumption of the wireless communication apparatus can be reduced. Further, information transmitted from an outside target that is likely to affect the driving operation and driving safety of the host vehicle is estimated to be useful for the host vehicle. An outside target located far from the host vehicle is not likely to affect the driving of the host vehicle. Therefore, information transmitted from an outside target located far from the host vehicle is estimated to be not useful for the host vehicle.

The wireless communication apparatus according to the present disclosure decreases the information reception frequency of the receiver in accordance with an increase in the distance to the outside target closest to the host vehicle. Therefore, when presumably useful information for the host vehicle is not likely to be transmitted from an outside target, it is possible to decrease the information reception frequency. Thus, the power consumption of the receiver can be reduced. When presumably useful information for the host vehicle is more likely to be transmitted from an outside target, a decrease in the information reception frequency of the receiver is avoided. Thus, the presumably useful information for the host vehicle can be received more promptly.

An alternative wireless communication apparatus according to the present disclosure includes a communication section 34 and a display state determination section 360. The communication section 34 communicates with a display apparatus having a screen that displays the positions of outside targets and the position of the host vehicle in accordance with the positions of the outside targets and the position of the host vehicle, which are determined by using the position determination information received by the receiver. In accordance with information acquired from the display apparatus by the communication section, the display state determination section 360 determines whether or not to display the positions of the outside targets on the screen of the display apparatus. When the display state determination section 360 has determined not to display the positions of the outside targets, the reception frequency changing section decreases the information reception frequency compared with a case in which the display state determination section 360 has determined to display the positions of the outside targets.

It is conceivable that an outside target not displayed on the screen of the display apparatus is less likely to affect the driving of the host vehicle than an outside target displayed on the screen of the display apparatus. Therefore, information transmitted from an outside target not displayed on the screen of the display apparatus is estimated to be less useful for the host vehicle than information transmitted from an outside target displayed on the screen of the display apparatus.

When the display state determination section has determined not to perform a display of an outside target, the wireless communication apparatus according to the present disclosure selects a lower information reception frequency for the receiver compared with a case in which the display state determination section has determined to perform a display of an outside target. Therefore, in this respect, too, when presumably useful information for the host vehicle is not likely to be transmitted from an outside target, it is possible to decrease the information reception frequency of the receiver while reducing the power consumption.

A vehicular apparatus according to the present disclosure includes the above-described wireless communication apparatus and a display apparatus. The display apparatus is used in a vehicle to display the position of an outside target and the position of the host vehicle over an electronic map in accordance with the position of the outside target and the position of the host vehicle, which are determined based on the position determination information received by the receiver of the wireless communication apparatus.

Consequently, as the above-described wireless communication apparatus, it is possible to receive presumably useful information for the host vehicle more promptly while reducing the power consumption.

Further, as the display apparatus according to the present disclosure is used in the above-described vehicular apparatus, it is possible to receive presumably useful information for the host vehicle more promptly while reducing the power consumption.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A wireless communication apparatus for a vehicle comprising:

a receiver receiving information transmitted from each of a plurality of external communication apparatuses via a wireless communication, the plurality of external communication apparatuses being located outside of a host vehicle to which the wireless communication apparatus is provided;

a distance calculation section calculating a distance between the host vehicle and each of a plurality of outside targets based on position determination information under a condition that the information transmitted from each of the plurality of external communication apparatuses includes the position determination information, the plurality of outside targets being located around the host vehicle and being provided with the plurality of external communication apparatuses, respectively, and a position of each of the plurality of outside targets being specified based on the corresponding position determination information;

a reception frequency changing section decreasing an information reception frequency of the receiver in accordance with an increase in the distance between the host vehicle and one of the plurality of outside targets, which is located closest to the host vehicle; and a communication section communicating with a display apparatus, wherein the display apparatus includes a screen that displays the position of each of the plurality of outside targets and a position of the host vehicle in accordance with the position of each of the plurality of outside targets and the position of the host vehicle, and the position of each of the plurality of outside targets is determined based on the corresponding position determination information received by the receiver; and a display state determination section determining whether the position of each of the plurality of outside targets is in a display state or in a non-display state on the screen of the display apparatus based on display state information that is acquired by the communication section from the display apparatus;

wherein the reception frequency changing section decreases the information reception frequency of the receiver in a case where the display state determination section determines that the position of each of the plurality of outside targets is in the non-display state compared with a case where the display state determination section determines that the position of each of the plurality of outside targets is in the display state.

2. The wireless communication apparatus according to claim 1, wherein the display apparatus changes a display scale for displaying a relative positional relationship between the position of each of the plurality of outside targets and the position of the host vehicle on the screen, the reception frequency changing section decreases the information reception frequency of the receiver when the display apparatus changes the display scale for displaying the relative positional relationship and the display state determination section determines that the position of each of the plurality of outside targets is switched from the display state to the non-display state on the screen of the display apparatus, and the reception frequency changing section increases the information reception frequency of the receiver when the display apparatus changes the display scale for displaying the relative positional relationship and the display state determination section determines that the position of each of the plurality of outside targets is switched from the non-display state to the display state on the screen of the display apparatus.

3. The wireless communication apparatus according to claim 1, wherein the one of the plurality of outside targets is a moving object, the wireless communication apparatus further comprising
an approach determination section determining an approach between the host vehicle and the moving object under a condition that the information transmitted from the external communication apparatus provided to the moving object and received by the receiver includes travelling direction information together with the position determination information, the approach determination section specifying a traveling direction of the moving object based on the travelling direction information, and the approach determination section determining the approach between the host vehicle and the moving object based on the travelling direction of the moving object, a travelling direction of the host vehicle, the position of the moving object which is specified based on the position determination information, and the position of the host vehicle,
wherein the reception frequency changing section determines the information reception frequency of the receiver according to the distance calculated by the distance calculation section and a determination result of the approach determination section.

4. The wireless communication apparatus according to claim 1, wherein the one of the plurality of outside targets is a moving object and an altitude of the moving object is specified based on the position determination information, the wireless communication apparatus further comprising
an altitude difference calculation section calculating an altitude difference between the host vehicle and the moving object based on the position determination information when the receiver receives the position determination information from the external communication apparatus provided to the moving object,
wherein the reception frequency changing section determines the information reception frequency of the receiver according to the distance calculated by the distance calculation section and the altitude difference between the host vehicle and the moving object.

5. The wireless communication apparatus according to claim 1, wherein
the one of the plurality of outside targets is a moving object, and
when the receiver receives, from the external communication apparatus provided to the moving object, the position determination information and speed determination information based on which a speed of the moving object can be specified, the reception frequency changing section determines the information reception frequency of the receiver according to the distance calculated by the distance calculation section, the speed of the moving object, and a speed of the host vehicle.

6. The wireless communication apparatus according to claim 1, wherein the one of the plurality of outside targets is an intersection, the wireless communication apparatus further comprising
an approach determination section determining an approach of the host vehicle toward the intersection based on a position of the intersection, the position of the host vehicle, the traveling direction of the host vehicle, wherein the position of the intersection is determined based on the position determination information,
wherein the reception frequency changing section determines the information reception frequency of the receiver according to the distance calculated by the distance calculation section and a determination result of the approach determination section.

7. A vehicular apparatus comprising:
the wireless communication apparatus according to claim 1; and
a display apparatus disposed in the host vehicle and displaying the position of the one of the plurality of outside targets and the position of the host vehicle in overlapped manner on an electronic map in accordance with the position of the one of the plurality of outside targets and the position of the host vehicle, wherein the position of the one of the plurality of outside targets is specified based on the corresponding position determination information received by the receiver of the wireless communication apparatus.

8. A display apparatus for the vehicular apparatus according to claim 7, the display apparatus comprising
a transmitting section transmitting display state information to a wireless communication apparatus included in the vehicular apparatus, wherein the wireless communication apparatus determines whether the position of each of the plurality of outside targets is in the display state or in the non-display state on the screen of the display apparatus based on the display state information transmitted from the transmitting section.

9. The wireless communication apparatus according to claim 1, wherein:
the receiver is configured to periodically enter a sleep state for a sleep period; and
the reception frequency changing section decreases the information reception frequency of the receiver in accordance with an increase in the sleep period of the receiver.

* * * * *